US008751954B2

(12) United States Patent
Luk et al.

(10) Patent No.: US 8,751,954 B2
(45) Date of Patent: Jun. 10, 2014

(54) SYSTEM AND METHOD FOR SCROLLING INFORMATION IN A UI TABLE

(75) Inventors: Philip Luk, North York (CA); Matthew Lee, Belleville (CA)

(73) Assignee: BlackBerry Limited, Waterloo (CA)

(*) Notice: Subject to any disclaimer, the term of this patent is extended or adjusted under 35 U.S.C. 154(b) by 469 days.

(21) Appl. No.: 12/372,820

(22) Filed: Feb. 18, 2009
(Under 37 CFR 1.47)

(65) Prior Publication Data
US 2010/0211908 A1 Aug. 19, 2010

(51) Int. Cl.
*G06F 3/0485* (2013.01)
(52) U.S. Cl.
USPC ........... 715/786; 715/784; 715/774; 715/810; 715/812
(58) Field of Classification Search
CPC ..................................................... G06F 3/0485
USPC ........................................................... 715/786
See application file for complete search history.

(56) References Cited

U.S. PATENT DOCUMENTS

| 5,835,084 | A | * | 11/1998 | Bailey et al. | 715/783 |
|---|---|---|---|---|---|
| 7,167,728 | B1 | * | 1/2007 | Wagner et al. | 455/566 |
| 7,395,500 | B2 | * | 7/2008 | Whittle et al. | 715/243 |
| 7,580,702 | B2 | * | 8/2009 | Othmer | 455/412.2 |
| 7,607,088 | B2 | * | 10/2009 | Bertram et al. | 715/711 |
| 7,689,916 | B1 | * | 3/2010 | Goel et al. | 715/711 |
| 7,856,602 | B2 | * | 12/2010 | Armstrong | 715/830 |
| 2001/0045949 | A1 | * | 11/2001 | Chithambaram et al. | 345/418 |
| 2003/0020755 | A1 | * | 1/2003 | Lemelson et al. | 345/786 |
| 2006/0066567 | A1 | * | 3/2006 | Scharenbroch et al. | 345/156 |
| 2006/0100002 | A1 | * | 5/2006 | Luebke et al. | 455/574 |
| 2006/0123341 | A1 | * | 6/2006 | Smirnov | 715/708 |
| 2006/0242595 | A1 | * | 10/2006 | Kizumi | 715/786 |
| 2006/0242596 | A1 | * | 10/2006 | Armstrong | 715/786 |
| 2007/0047697 | A1 | * | 3/2007 | Drewry et al. | 379/88.13 |
| 2007/0052689 | A1 | * | 3/2007 | Tak | 345/173 |
| 2007/0204235 | A1 | * | 8/2007 | Gudi et al. | 715/774 |
| 2007/0245241 | A1 | * | 10/2007 | Bertram et al. | 715/711 |
| 2007/0250592 | A1 | * | 10/2007 | Reckamp et al. | 709/217 |

(Continued)

FOREIGN PATENT DOCUMENTS

EP 1942400 A1 7/2008

OTHER PUBLICATIONS

Extended European Search Report issued by the European Patent Office dated Jul. 28, 2009 for corresponding European Patent Application No. 09153085.7.

(Continued)

*Primary Examiner* — William Bashore
*Assistant Examiner* — Reza Nabi
(74) *Attorney, Agent, or Firm* — Gowling Lafleur Henderson LLP

(57) ABSTRACT

Displaying information in a column of a user interface (UI) on a display screen is enhanced by a column scroll control that displays information that is otherwise truncated from display in the space allocated to the column. The control is sensitive to a threshold limited scrolling input from a user to activate the display of the information ticker style. The display of the remainder of the user interface may be maintained while the column is scrolled. The controls are advantageous for trackball and similar pointing devices especially those used with handheld wireless communication devices (cellular phones, PDAs, smart phones, etc.) where one handed operation is desirable and where display screen sizes and resolutions often require truncation of information in a particular column entry or entries.

16 Claims, 5 Drawing Sheets

(56) References Cited

U.S. PATENT DOCUMENTS

| | | |
|---|---|---|
| 2008/0040450 A1* | 2/2008 | Appleyard et al. ............ 709/219 |
| 2008/0158170 A1* | 7/2008 | Herz et al. .................... 345/173 |
| 2008/0171535 A1* | 7/2008 | Carmody et al. .......... 455/412.2 |
| 2008/0177858 A1* | 7/2008 | Aarnio et al. ................. 709/217 |
| 2008/0207182 A1* | 8/2008 | Maharajh et al. .......... 455/414.1 |
| 2008/0303824 A1* | 12/2008 | Suzuki ........................... 345/467 |
| 2009/0079704 A1* | 3/2009 | Huang et al. ................. 345/173 |
| 2009/0138816 A1* | 5/2009 | Kawashima .................. 715/787 |
| 2009/0199091 A1* | 8/2009 | Covington .................... 715/256 |
| 2010/0085380 A1* | 4/2010 | Tsuda ........................... 345/629 |
| 2010/0099462 A1* | 4/2010 | Baek et al. .................... 455/566 |
| 2010/0211908 A1* | 8/2010 | Luk et al. ...................... 715/786 |
| 2011/0267753 A1* | 11/2011 | Murayama ................. 361/679.3 |

OTHER PUBLICATIONS

Canadian Office Action dated Jun. 21, 2012 issued by the Canadian Intellectual Property Office relating to Canadian Patent Application No. 2,692,834.

* cited by examiner

SYSTEM AND METHOD FOR SCROLLING INFORMATION IN A UI TABLE

FIELD

The present application relates to displaying information in a user interface (UI) of a computing device, for example, a wireless handheld device.

BACKGROUND

Communication devices such as personal computers, handheld devices including wireless mobile devices (cellular phones, PDAs, etc.), among others, have or are coupled to a display screen for presenting information to users. Information is presented by way of a graphical user interface (GUI) of an application or the operating system for the device, for example, and may include information displayed in a tabular form. Spreadsheets are one example of a tabular form where information is displayed in rows and columns of a table. Other information in columnar form includes a single column list. Popular examples of information displayed in tabular form are email and other message box lists where message information is listed in rows having columns of message information such as Time, To, and Subject data.

Many of these devices include a trackball or similar pointing device for moving a focus (e.g. a cursor) about the GUI to bring particular GUI controls into focus to use and control the device. Typically the controls are selected by moving the pointing device, thus scrolling the focus, substantially along a first axis such as up/down the screen.

The size of the screen (i.e. the overall screen dimensions at a particular resolution) often limits the amount of information that may be viewed at any one time. This is particular true for wireless mobile devices. In many cases, the information for a particular column entry (sometimes referred to as a "cell") or multiple cells in the column cannot be displayed in the space allotted in the GUI. Only a portion of the available information is displayed, usually from left to right, truncating information to the right that does not fit.

BRIEF DESCRIPTION OF THE DRAWINGS

In order that the subject matter may be readily understood, embodiments are illustrated by way of examples in the accompanying drawings, in which.

DETAILED DESCRIPTION

Device users desire to display and view information on their devices quickly and with minimal user inputs. Users of wireless mobile devices in particular desire to operate their devices while doing other activities such as walking. One-handed operation is also desired, often to facilitate these other activities. Hence, it is desired to obtain and view information truncated in a particular GUI quickly and with minimal user inputs.

Displaying information in a column of a user interface (UI) on a display screen is enhanced by a column scroll control that displays information that is otherwise truncated from display in the space allocated to the column. The control is sensitive to a threshold limited scrolling input from a user to activate the display of the information ticker style. The display of the remainder of the user interface may be maintained while the column is scrolled. The controls are advantageous for trackball and similar pointing devices especially those used with handheld wireless communication devices (cellular phones, PDAs, smart phones, etc.) where one handed operation is desirable and where display screen sizes and resolutions often require truncation of information in a particular column entry or entries.

In one aspect, there is provided a method of scrolling information in a user interface on a display screen. The method comprises: displaying information within a space of the user interface allocated to the space on the display screen and wherein the information is truncated to fit the space; providing a scroll control that, when selected, is operable to scroll the information in the space to display the truncated information in response to a user providing threshold limited scrolling input via a pointing device; and displaying the truncated information ticker style automatically in response to said user input.

In another aspect there is provided a system for scrolling information in a user interface on a display screen. The system comprises: the display screen and pointing device providing directional input along at least two axes; and a processor and memory coupled thereto. The memory stores instructions and data for configuring the execution of the processor to:

display information in a column of the user interface within a space allocated to the column on the display screen and wherein the information is truncated to fit the space;

provide a column scroll control that, when selected, is operable to scroll the column to display the truncated information in response to a user providing threshold limited scrolling input via the pointing device; and display the truncated information in the space ticker style automatically in response to said user input.

In a further aspect there is provided a computer program product having computer readable code embodied therein, for execution by a processor for configuring a computer to display information in a user interface on a display screen according to the method aspect.

Figures 1, 2:
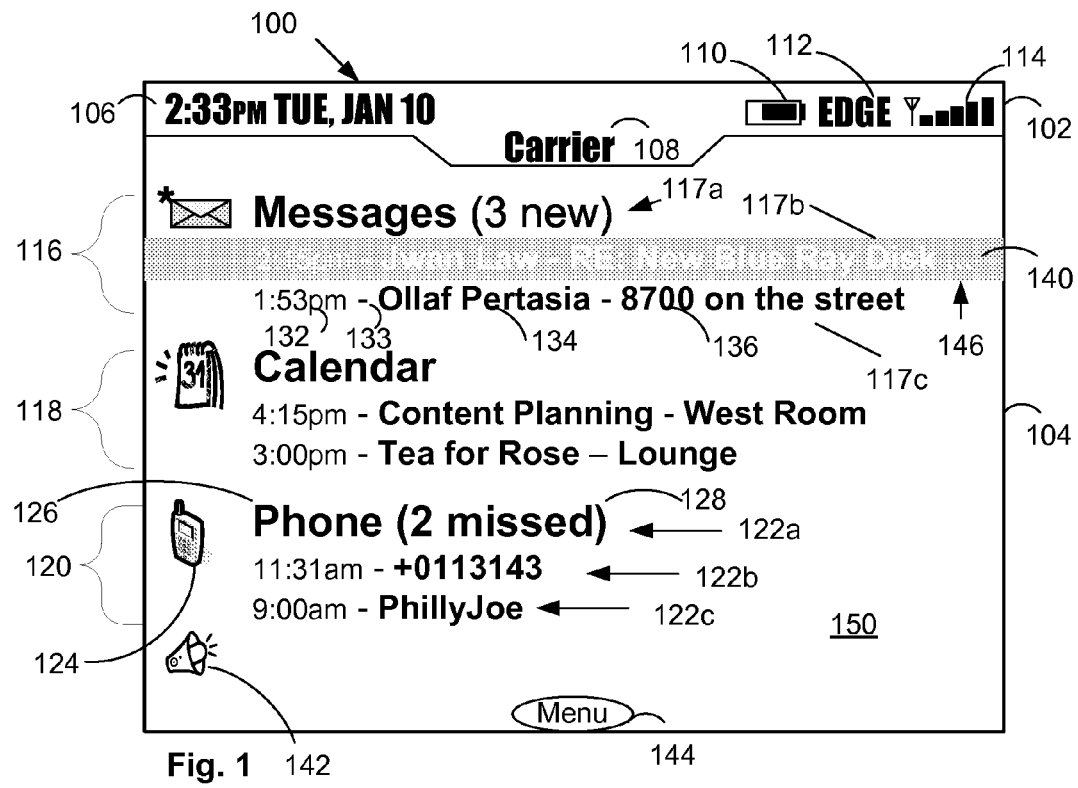
FIGS. 1-4 illustrate views of a GUI for displaying information in a cell of a table in accordance with an embodiment.
Figure 3:
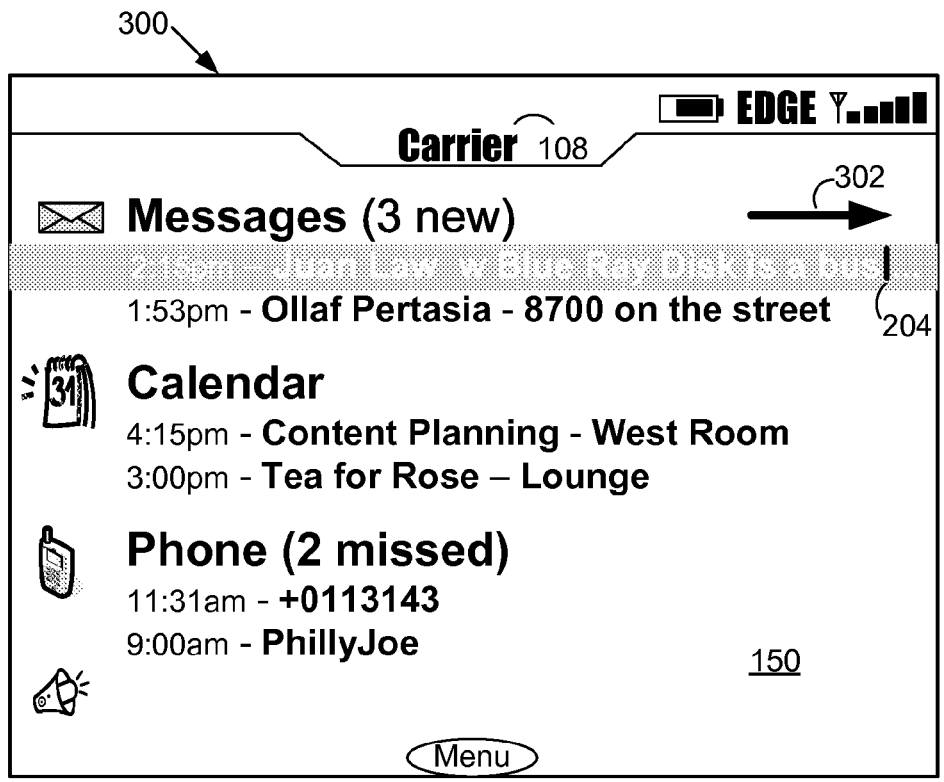

FIGS. 1-4 illustrate representative views of a UI for displaying information in tabular form, in one or more rows having one of more columns, on a display screen of a computing device. View 100 of FIG. 1 shows a display screen 150 wherein at least some of the information is in tabular form as described further. In the representative UI, display screen 150 is divided to display an information bar 102, showing certain status information (e.g. time/date 106, carrier brand 108, battery level 110, network 112 signal 114, etc,) as is well-known, and a main window 104. In the example view 100, main window 104 shows a home screen interface for displaying information from one or more applications such as a message application 116, appointment calendar application 118 and telephone application 120. The home screen interface is also for invoking these applications. Additional information in the form of icons 142 and 144 is displayed for invoking other features/applications of the computing device.

In the representative view 100, information from applications 116, 118 and 120 is shown in a plurality of rows (e.g. 122a, 122b and 122c for application 120 and rows 117a, 117b and 117c for application 116). A title row (e.g. 122a) displays an icon 124 and application name 126 associated with the application 120. Optionally, an associated event counter (e.g. 128) may be displayed. Also displayed is event preview information for events associated with the application. For example, in association with application 116, rows 117b and 117c show preview information for new (email) message events as controlled by message application 116. Each of rows 117b and 117c are divided to show the information in columns. The information may include message time information (e.g. 132) message party (To/From) information (e.g. 134) and message subject information (136). A column divider (e.g. 133) may be shown to delimit the columns as a column's relative position on the display screen 150 may not be fixed. Calendar application 118 event preview information may include appointment time information, appointment description information and appointment location information. Similar call time and caller information may be shown for telephone application 120.

When more information for a particular column is available than will fit in an area of display screen 150 allocated to the column, the information is truncated to fit. An indicator 146 (e.g. an ellipsis " . . . ") may be displayed to indicate that the truncated information is available.

As is common, in accordance with the controls associated with the present UI, a focus 140 such as a cursor may be moved about the display screen to bring various control regions (e.g. an icon, a row, etc.) into focus. For example, focus 140 may be moved to bring an individual row (e.g. 117a) associated with an application (e.g. 116) into focus. Focus 140 is moved using a pointing device (see FIGS. 5 and 7) such as a trackball operated by a user wherein the ball is rolled upward to move the focus up the screen and downward to move the focus down the screen in a scrolling action along a first axis.

A control associated with the particular row may be invoked (e.g. such as by clicking a selection button or key, a clickable pointing device, or the like). Invoking a control associated with row 117a brings the main user interface for application 116 forward, such as to show all messages (not shown). Invoking a control in association with row 117b or 117c may bring forward another user interface for application 116 to display only the associated message event displayed in the respective row (not shown). In these scenarios, the view 100 is changed substantially as the application 116 is invoked. The present view 100 is replaced with a different view (e.g. 500 of FIG. 5 in a message application embodiment). To get back to the home screen interface, further user input is required. Similar results apply for invoking the controls associated in the UI interface of view 100 for the calendar 118 and phone applications 120. Thus in accordance with the prior art, to view the truncated information, additional key strokes or other user input was necessary to invoke the associated application and more fully display the event of interest to view the truncated information.

To display information truncated from a column in the present interface, a further control is provided. The display of the information associated with the particular column (e.g. subject column 136) may be changed (i.e. the column scrolled) while continuing to display the information in other regions of the display screen in the view. Furthermore, the display of the truncated information may be invoked upon detection of certain scrolling movement of the pointing device associated with focus 140.

In the present embodiment, a respective column scroll control associated with columns (e.g. 136) is provided by the home screen interface to display truncated information while continuing to display other information. View 200 of FIG. 2 shows focus 204 in the form of a cursor. Direction indicator 202 shows rightward movement of the pointing device in a second axis (e.g. perpendicular to the first axis of movement that moves the focus between the rows) to select UI controls.

With focus 140 on row 117b (e.g. see too view 100), detection of rightward movement of the pointing device invokes the associated column scroll control to change the display of information (i.e. scroll) in column 136 while leaving the other information as is. Focus 140 may be changed to show a cursor 204 to bring attention to the invocation of the column scroll control though such is not necessary.

As the pointing device is moved rightward, meeting a certain threshold, (i.e. the user provides scrolling input that is threshold limited) the truncated information available for display in the column is scrolled. The information is displayed, ticker style, removing information (typically characters) from the left and adding to the right. See too FIG. 3 and view 300 as more of the truncated information (characters) are shown in simulation of the ticker movement. Once initiated, the scrolling may continue automatically, without further user input, until all of the information is displayed. Alternatively, the user may be required to continue right scrolling (indicated by arrow 302) to more finely control the scrolling of the information in the column. The ticker style displaying of the information may be stopped if the user stops the scrolling input. Optionally, should the user switch direction and input leftward movement to the point device, the information may scroll left (not shown).

Figure 4:

With reference to FIG. 4, movement of the pointing device downwards (indicated by directional arrow 402) or upwards (not shown) to move focus 140 away from the row 117b in which the column scroll control is invoked to provide the ticker style display may cause the interface to re-display column 136 in that row showing the information from left to right and right truncated. Optionally, moving the pointing device leftward (not shown) may also automatically re-display the information in this manner if leftward movement does not signal a left scrolling display action.

Figure 5:
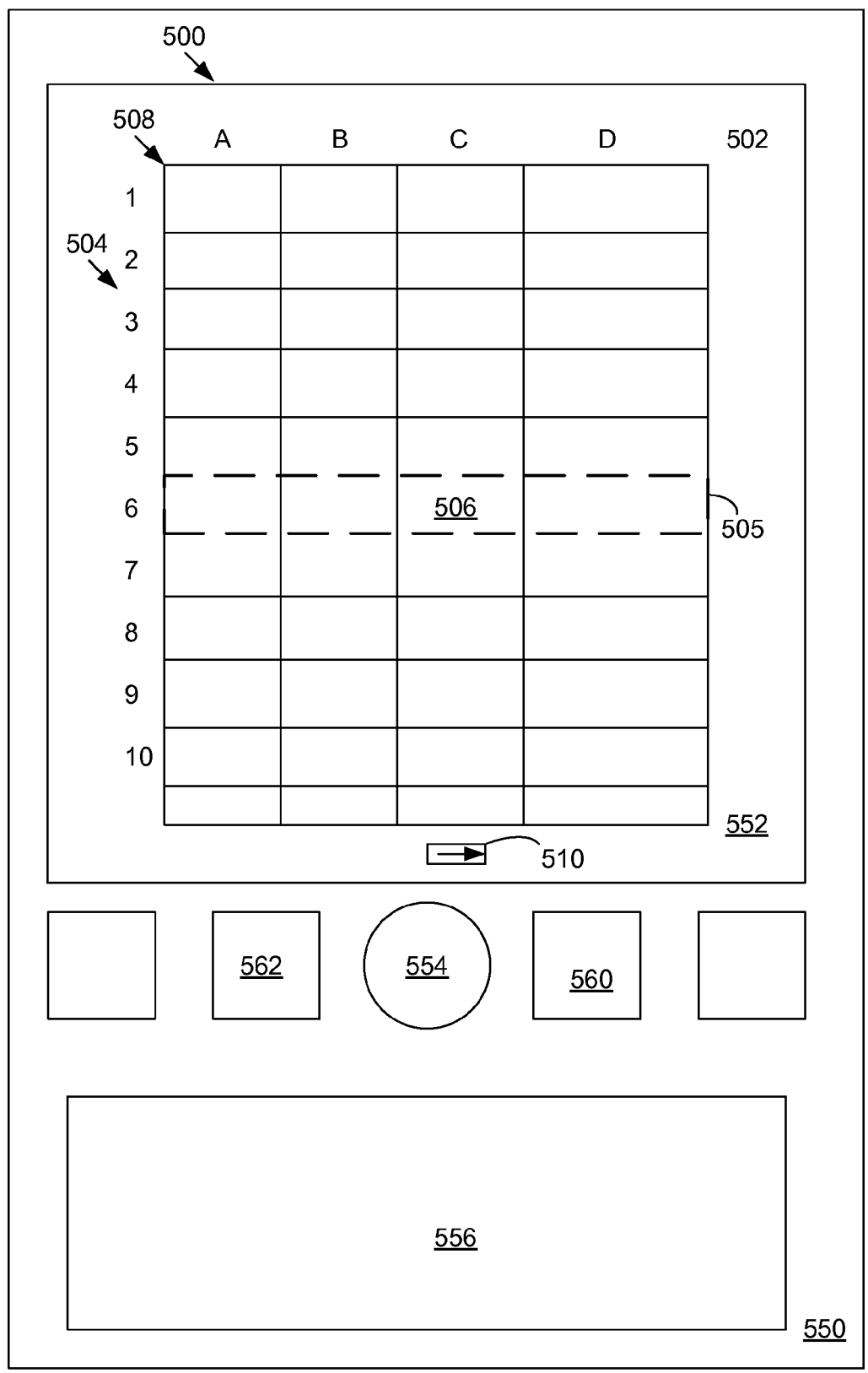
FIG. 5 illustrates a representative wireless mobile device with a display screen showing a GUI for displaying information in cells of a table in accordance with an embodiment.

FIG. 5 illustrates a representative wireless mobile device 550 having a display screen 552 showing a GUI for displaying information in cells of a table in accordance with an embodiment. FIG. 5 shows a view 500 of an example table 508 having columns 502 (notionally A to D) and rows 504 (notionally 1 to N but only 10 are shown). The table 508 may represent a spreadsheet or a list of messages such as in an email application. More or fewer columns may be used. Some rows of table 508 may not have the same or as many columns of information as other rows. For example, in a message application embodiment, rows of messages may be interspersed with headings dividing the messages by date for example. A scroll control thus need not be provided for every row in a table.

In a message application embodiment where the table 508 is a list of message events, for each message in a row (e.g. 6) of the table, columns A-D may present a respective message icon, message time, message party (e.g. To or From) and message subject (all not shown). A focus (indicated by dashed lines 505) may be moved, moving trackball 554 along a first axis (e.g. up/down), about the UI as described above to bring various multiple cells (e.g. row 6) into focus. A column scroll control may be invoked to operate a ticker-style display of information for a cell 506 (i.e. column in a particular row).

Where there is too much information for a particular cell entry 506 (e.g. C6) to fit in the allocated space on the display screen 552, the information is truncated as described above. Where the table 508 represents a list of messages in an email application for example, a particular message may be selected and opened to display its contents, such as, the message sender, recipient, copy and other address information, subject line, body, attachments, etc. Opening the message is one way of showing the truncated information from a column of the table 508; however, it requires additional activity to return to the message application's main screen interface. The display of the particular message is not in the context of the other messages. As described above, rightward movement of a pointing device 554 (e.g. a trackball) that exceeds a threshold may be used to trigger (automatically and without further user input) ticker-style display of information for a cell (e.g. 506) while leaving the display of the other information in the table unchanged.

Though not illustrated, more than one row 504 may be selected, as is well known, such as by moving along the first axis among the rows and selecting (e.g. via a click or menu action). Rightward movement of the pointing device 554 exceeding a threshold may invoke a column scroll control to scroll, ticker-style, the information from respective cells of the selected rows.

More than one cell in a row may have too much information requiring truncated display. Rightward movement may trigger ticker display of one or more of such columns. Control over which columns is to be scrolled when rightward motion of the point device is detected above the threshold could be a user option e.g. selectable or otherwise definable via a menu option (not illustrated).

Alternatively or additionally, control for specific columns may be facilitated by holding a pre-set key (e.g. from keyboard 556) when moving rightward. For example, pressing key "C" (not illustrated) of keyboard 556 may scroll the display of information ticker-style in column C when scrolling rightward beyond the threshold to trigger the ticker-style display as described. As noted, scrolling rightward does not move the focus 505 but triggers the ticker-style displaying of truncated information. The other displayed information (i.e. not in the column associated with the control) remains displayed.

In many of the embodiments described above, the column scroll control is associated with a particular row of a table such that moving a focus to the row automatically selects the column scroll control. Alternatively or in addition, a column scroll control may be provided that is independent of the rows and/or table per se but remains associated thereto. That is the focus need not be on the table/row to invoke a column scroll control.

For example, scroll control 510 may be provided. Though shown below table 508 it may be positioned otherwise such as at a top of the table. A user may navigate to control 510 in a same manner as navigating rows 504. When control 510 is selected, a scroll of trackball 554, along the axis of interest to control 510 and in accordance with the threshold, triggers the ticker-style scrolling of information in each cell of a column (e.g. cells C1, C2 . . . C10) associated to the control 510. Control 510 may be selectively associated to a column such as via a menu option to define the association (not shown). Its position on the display screen 552 may be moved near the selected column in response to the association. Alternatively or in addition, control 510 may be selectively associated to a column by pressing a pre-set key (e.g. key "A" of keyboard 556) to control scrolling of column A while the control 510 is selected and the user scrolls along the axis of interest using trackball 554.

Though described in terms of scrolling between rows to invoke ticker-style display of information in a column of a row upon which a pointer is focused, persons of skill in the art will appreciate that operations may be adapted to focus on a column and scroll ticker-style information from a row of the column.

Device 550 comprises a number of user input devices including a trackball pointing device 554, various buttons (e.g. 560, 562) and keyboard 556 with a plurality of keys primarily for inputting text. Trackball 554 facilitates directional pointing input, detecting movement of the ball in its socket along two axes. Other similar pointing devices may include a miniature joystick input device (not shown) that allow directional input that may be resolved to indicate movement along different (e.g. perpendicular) axes. Such directional input can be resolved as up/down and left/right for moving a focus among control regions of a user interface as is well-known.

Figure 6:
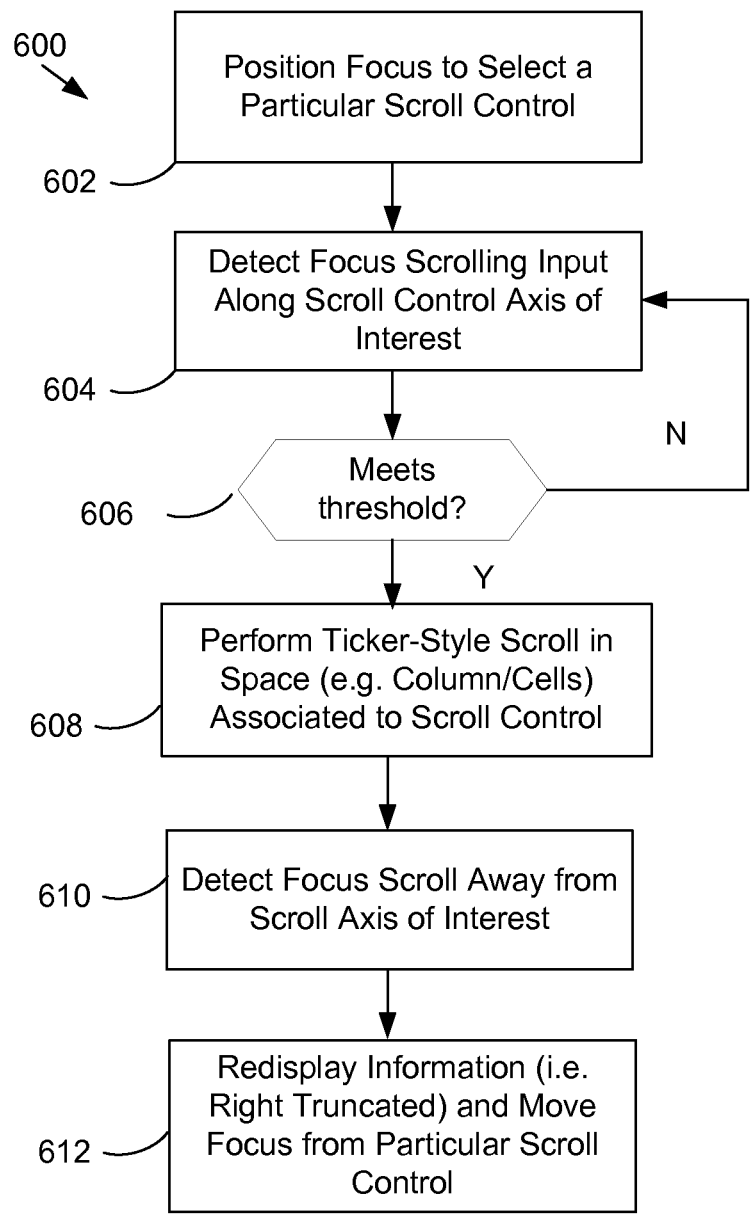
FIG. 6 is a flowchart of operations of a device GUI for displaying truncated information ticker style in accordance with an embodiment.

Persons of ordinary skill in the art will understand that device 550 may be programmed (e.g. using software) to provide the ticker-style operations described. FIG. 6 is a block diagram showing operations 600 for displaying, ticker-style, truncated information in a space allocated on the screen (e.g. a column (or cell)) in accordance with one embodiment. At step 602 the focus is in a position to select a particular scroll control. The control is associated to the space that is to be scrolled, such as in FIG. 2 or 5, where the focus is on a row with a column having more information. Positioning the focus on a row may automatically select the scroll control for that row. Positioning on a separate control (e.g. 510) may automatically select the control. Though not shown in FIG. 6, a key press may be detected to selectively associated the control to a particular space such as a column.

At steps 604-606, a determination is made whether the scrolling input along the scroll control's axis of interest (i.e. rightward input of the pointing device) meets (e.g. is equal to or greater than) a predetermined threshold. For example, a threshold may be that the users scrolls to the right 3 times within 0.5 seconds. This threshold limited scrolling event may be detected to signal (trigger) the UI change to scroll the information in the column, ticker-style. Other thresholds may be used. For example, for a mini joystick, sustained right input may be detected within period of time.

At step 608, ticker-style information scrolling begins. Text from the left is removed and truncated information is added from the right in the space of display screen 552 allocated to the scrolling cell or cells of the column or columns being scrolled. The ticker-style display of the truncation information may be performed automatically until all the truncated information is displayed. The other information (e.g. in other columns, rows etc.) remains unchanged as the controlled column (or cell thereof) is ticker-style scrolled automatically. Optionally, a cursor may be shown indicating the scrolling (See FIG. 2).

Automatic ticker-style scrolling of the information may be further responsive to user scrolling input (via trackball 554) along the scrolling axis of interest. Scrolling in an opposite direction to the trigger (e.g. leftward), for example, may stop the ticker-style scrolling at a particular point (e.g. partially scrolled) or may redisplay the information from left to right and right truncated (both not illustrated).

In a further embodiment (not shown) initial leftward scrolling along the scrolling axis may cause the ticker-style display to scroll leftward or backward from the end of the information of column. The control may begin the display from the right end of the truncated information to left truncate the information in the column space and then scroll by adding information to the left and taking from the right in the space allocated to the column/cell.

If the focus is moved from the row along the first axis (e.g. perpendicular) to the column scrolling axis, the scrolling of the information may be reset (steps 610 and 612), redisplaying the information in the column/cell right truncated to fit the space and operations 600 may repeat at step 602.

User interfaces for applications, operating systems, etc, may be configured with controls for scrolling a column entry or column with multiple entries, which control is responsive to a scrolling threshold to display additional information ticker style. For example, a list of browser history URLs or a browser bookmark list of URLs may be configured for ticker-style scrolling individually or in a column to display the URL information. In a telephone application, for example, having a column displaying a caller's phone number, a right scroll may trigger ticker-style display of additional numbers for the caller, preferably one a time, ((e.g. pausing between ticker-style display of another number) to facilitate selection of desired number to make a call. Selection of a number avoids keypad typing of the number and hence may reduce dialling errors.

The controls are advantageous for trackball and similar pointing devices especially those used with handheld wireless communication devices (cellular phones, PDAs, smart phones, etc.) where one handed operation is desirable and where display screen sizes and resolutions often require truncation of information in a particular column entry or entries.

Figure 7:
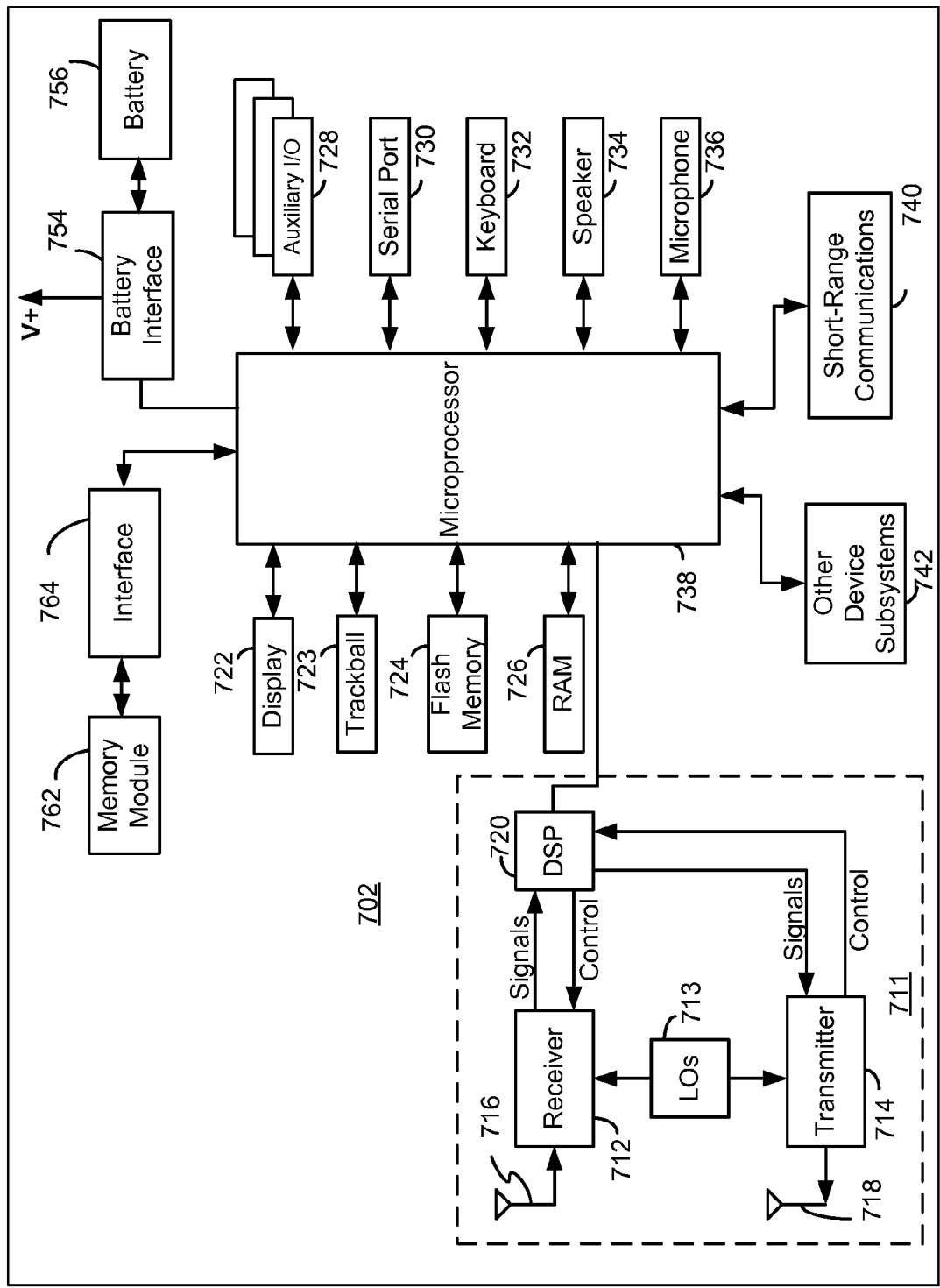
FIG. 7 s a block diagram which illustrates pertinent components of a wireless handheld communication device that communicates within a wireless network (not shown) and that is an example of a computing device that may be adapted to display truncated information in accordance with the teachings herein.

FIG. 7 is a detailed block diagram of a preferred wireless communication device 702. Wireless communication device 702 is preferably a two-way communication device having at least voice and advanced data communication capabilities, including the capability to communicate with other computer systems. Depending on the functionality provided by wireless communication device 702, it may be referred to as a data messaging device, a two-way pager, a cellular telephone with data messaging capabilities, a wireless Internet appliance, or a data communication device (with or without telephony capabilities). Wireless communication device 702 may communicate with any one of a plurality of base station transceiver systems within its geographic coverage area.

Wireless communication device 702 will normally incorporate a communication subsystem 711, which includes a receiver 712, a transmitter 714, and associated components, such as one or more (preferably embedded or internal) antenna elements 716 and 718, local oscillators (LOs) 713, and a processing module such as a digital signal processor (DSP) 720. As will be apparent to those skilled in field of communications, particular design of communication subsystem 711 depends on the communication network in which wireless communication device 702 is intended to operate.

Wireless communication device 702 may send and receive communication signals over the network after required network registration or activation procedures have been completed. Signals received by antenna 716 through the network are input to receiver 712, which may perform such common receiver functions as signal amplification, frequency down conversion, filtering, channel selection, and like, and in example shown in FIG. 7, analog-to-digital (A/D) conversion. A/D conversion of a received signal allows more complex communication functions such as demodulation and decoding to be performed in DSP 720. In a similar manner, signals to be transmitted are processed, including modulation and encoding, for example, by DSP 720. These DSP-processed signals are input to transmitter 714 for digital-to-analog (D/A) conversion, frequency up conversion, filtering, amplification and transmission over communication network via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network access is associated with a subscriber or user of wireless communication device 702, and therefore wireless communication device 702 requires a memory module 762, such as a Subscriber Identity Module or "SIM" card or a Removable User Identity Module (R-UIM), to be inserted in or connected to an interface 764 of wireless communication device 702 in order to operate in the network. Alternatively, memory module 762 may be a non-volatile memory which is programmed with configuration data by a service provider so that wireless communication device 702 may operate in the network. Since wireless communication device 702 is a mobile battery-powered device, it also includes a battery interface 754 for receiving one or more rechargeable batteries 756. Such a battery 756 provides electrical power to most if not all electrical circuitry in wireless communication device 702, and battery interface 754 provides for a mechanical and electrical connection for it. The battery interface 754 is coupled to a regulator (not shown in FIG. 7) which provides power V+ to all of the circuitry.

Wireless communication device 702 includes a microprocessor 738 which controls overall operation of wireless communication device 702. This control includes network selection techniques of the present application. Communication functions, including at least data and voice communications, are performed through communication subsystem 711. Microprocessor 738 also interacts with additional device subsystems such as a display 722, a flash memory 724, a random access memory (RAM) 726, trackball 723, auxiliary input/output (I/O) subsystems 728, a serial port 730, a keyboard 732, a speaker 734, a microphone 736, a short-range communications subsystem 740, and any other device subsystems generally designated at 742. Some of the subsystems shown in FIG. 7 perform communication-related functions, whereas other subsystems may provide "resident" or on-device functions. Notably, some subsystems, such as keyboard 732, trackball 723 and display 722, for example, may be used for both communication-related functions, such as entering a text message for transmission over a communication network, and device-resident functions such as a calculator or task list. Operating system software used by microprocessor 738 is preferably stored in a persistent store such as flash memory 724, which may alternatively be a read-only memory (ROM) or similar storage element (not shown). Those skilled in the art will appreciate that the operating system, specific device applications, or parts thereof, may be temporarily loaded into a volatile store such as RAM 726.

Microprocessor 738, in addition to its operating system functions, preferably enables execution of software applications on wireless communication device 702. A predetermined set of applications which control basic device operations, including at least data and voice communication applications, will normally be installed on wireless communication device 702 during its manufacture. A preferred application that may be loaded onto wireless communication device 702 may be a personal information manager (PIM) application having the ability to organize and manage data items relating to user such as, but not limited to, e-mail, calendar events, voice mails, appointments, and task items.

Naturally, one or more memory stores are available on wireless communication device 702 and SIM 762 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless communication device user's corresponding data items stored and/or associated with a host computer system thereby creating a mirrored host computer on wireless communication device 702 with respect to such items. This is especially advantageous where the host computer system is the wireless communication device user's office computer system. Additional applications may also be loaded onto wireless communication device 702 through network, an auxiliary I/O subsystem 728, serial port 730, short-range communications subsystem 740, or any other suitable subsystem 242, and installed by a user in RAM 726 or preferably a non-volatile store (not shown) for execution by microprocessor 738. Such flexibility in application installation increases the functionality of wireless communication device 702 and may provide enhanced on-device functions, communication-related functions, or both. For example, secure communication applications may enable electronic commerce functions and other such financial transactions to be performed using wireless communication device 702.

In a data communication mode, a received signal such as a text message, an e-mail message, or web page download will be processed by communication subsystem 711 and input to microprocessor 738. Microprocessor 738 will preferably further process the signal for output to display 722 or alternatively to auxiliary I/O device 728. A user of wireless communication device 702 may also compose data items, such as e-mail messages, for example, using keyboard 732 in conjunction with display 722 and possibly auxiliary I/O device 728. Keyboard 732 is preferably a complete alphanumeric keyboard and/or telephone-type keypad. These composed items may be transmitted over a communication network through communication subsystem 711.

For voice communications, the overall operation of wireless communication device 702 is substantially similar, except that the received signals would be output to speaker 734 and signals for transmission would be generated by microphone 736. Alternative voice or audio I/O subsystems, such as a voice message recording subsystem, may also be implemented on wireless communication device 702. Although voice or audio signal output is preferably accomplished primarily through speaker 734, display 722 may also be used to provide an indication of the identity of a calling party, duration of a voice call, or other voice call related information, as some examples.

Serial port 730 in FIG. 7 is normally implemented in a personal digital assistant (PDA)-type communication device for which synchronization with a user's desktop computer is a desirable, albeit optional, component. Serial port 730 enables a user to set preferences through an external device or software application and extends the capabilities of wireless communication device 702 by providing for information or software downloads to wireless communication device 702 other than through a wireless communication network. The alternate download path may, for example, be used to load an encryption key onto wireless communication device 702 through a direct and thus reliable and trusted connection to thereby provide secure device communication.

Short-range communications subsystem 740 of FIG. 7 is an additional optional component which provides for communication between wireless communication device 702 and different systems or devices, which need not necessarily be similar devices. For example, subsystem 740 may include an infrared device and associated circuits and components, or a Bluetooth™ communication module to provide for communication with similarly-enabled systems and devices. Bluetooth™ is a registered trademark of Bluetooth SIG, Inc.

Device 702 may be adapted to incorporate UI column scroll controls described with reference to FIGS. 1-7. For example, a message application or home screen user interface for displaying information in columns may be adapted to scroll a selected column entry or entries.

What is claimed is:

1. A method of scrolling information in a user interface on a display screen via an input device including a trackball, said method comprising:
    displaying information of a plurality of cells within a space of the user interface allocated on the display screen and wherein the information of a subset of the plurality of cells is truncated to fit the space;
    providing a scroll control that, when selected, is operable to scroll the information in the space to display the truncated information of the subset of cells in response to an input plurality of rolls of the trackball when the input number of rolls exceed user providing threshold limited scrolling input via a pointing device, the threshold limited scrolling input comprising a predetermined threshold number of inputs rolls performed in a selected direction along an axis of interest; and
    displaying the truncated information of the subset of cells ticker style automatically in the selected direction along the axis of interest in response to said user input to scroll the truncated information ticker style until all of the information is displayed without further user input; and
    wherein the user interface comprises a table having a one or more rows and one or more columns and wherein the scroll control is associated with a plurality of selected rows or a plurality of selected columns to scroll information in the respective cells of the selected rows or selected columns.

2. The method of claim 1 comprising, in response to user input deselecting the scroll control, redisplaying the information in the space to remove the truncated information.

3. The method of claim 1 comprising providing a plurality controlS: for operating the user interface including said scroll control, said controls selectable by moving a pointing device along a first axis and wherein said scroll control is Operable in response to scrolling input along a second axis perpendicular to the first axis.

4. The method of claim 1 comprising determining that the scrolling input via the pointing device meets a predetermined threshold to trigger the displaying of the truncated information.

5. The method of claim 1 comprising stopping the scroll of the information it response to user input.

6. A system for scrolling information in a user interface on a display screen via an input device including a trackball, said system comprising:
    the display screen and pointing device providing directional input along at least two axes;
    a processor and memory coupled thereto, said memory storing instructions and data for configuring the execution of the processor to:
        display information of a plurality of cells within a space of the user interface allocated on the display screen and wherein the information in a subset of the plurality of cells is truncated to fit the space;

provide a scroll control that, when selected, is operable to scroll the information in the space to display the truncated information of the subset of cells in response to an input plurality of rolls of the trackball when the input number of rolls exceed user providing threshold limited scrolling a predetermined threshold number of inputs rolls performed in a selected direction along an axis of interest; and display the truncated information of the subset of cells in the space ticker style automatically in the selected direction alone the axis of interest in response to said user input to scroll the truncated information until all of the information is displayed without further user input; and wherein the instructions and data configure the execution of the processor such that the user interface comprises a table having a one or more rows and one or more columns and wherein the scroll control is associated with a plurality of selected rows or a plurality of selected columns to scroll information in the respective cells of the selected rows or selected columns.

7. The system of claim 6 wherein the instructions and data configure the execution of the processor to redisplay the information in the column to remove the truncated information in response to user input deselecting the column scroll control.

8. The system of claim 6 wherein the instructions and data configure the execution of the processor to move a focus about the user interface to select the column scroll control in response to user input.

9. The system of claim 6 wherein the instructions and data configure the of the processor to provide a plurality controls for operating the user interface including said column scroll control, said controls selectable by moving a pointing device along a first axis and wherein said column scroll control is, when selected, operable in response to scrolling input along a second axis.

10. The system of claim 6 wherein the instructions and data configure the execution of the processor to determine that the scrolling input via the pointing device meets a predetermined threshold to trigger the display of the truncated information.

11. The system of claim 6 wherein the instructions and data configure the execution of the processor to stop the scroll of the Information in response to user input.

12. A computer program product having computer readable, code embodied therein, for execution by a processor for configuring a computer to display information in a user interface on a display screen Via an device including a trackball, the code configuring the execution of the processor to:

display information of a plurality of cells within a space of the use interface allocated on the display screen and wherein the information in a subset of the plurality of cells is truncated to fit the space;

provide a column scroll control that, when selected, is operable to scroll the column to display the truncated Information of the subset of cells in response to an input plurality of rolls of the trackball when the input number of rolls exceed user providing threshold limited scrolling input via a pointing device, toe threshold limited scrolling input comprising a predetermined threshold number of input rolls performed in a selected direction along an axis of interest; and display the truncated information of the subset of cells in the space ticker style automatically in the selected direction along the axis of interest in response to said user input to scroll the truncated information until all of the information is displayed without further user input; and wherein the code configures the execution of the processor such that the user interface comprises a table having a one or more rows and one or more columns and wherein the scroll control is associated with a plurality of selected rows or a plurality of selected columns to scroll information in the respective cells of the selected S or selected columns.

13. The computer program product of claim 12 wherein the code configures the execution of the processor to redisplay the information in the column to remove the truncated information in response to user input deselecting the column scroll control.

14. The computer program product of claim 12 wherein the code configures the execution of the processor to provide a plurality controls for operating the user interface including said column scroll control, said controls selectable by moving a pointing device along a first axis and wherein said column scroll control is, when selected, operable in response to scrolling input along a second axis.

15. The computer program product of claim 12 wherein the code configures the execution of the processor to determine that the scrolling input via the pointing device meets a predetermined threshold to the display of the truncated information.

16. The computer program product of claim 12 wherein the code configures the execution of the processor to stop the scroll of the information in response to user input.

* * * * *